April 6, 1948.  F. E. THOMPSON  2,438,980
LAWN MOWER GEAR AND LOCKING DEVICE
Filed July 31, 1946

Inventor
Francis E. Thompson
deceased,
By Albert E. Thompson,
Administrator.

Patented Apr. 6, 1948

2,438,980

UNITED STATES PATENT OFFICE 2,438,980

LAWN MOWER GEAR AND LOCKING DEVICE

Francis Edward Thompson, deceased, late of Lawrence, Mass., by Albert E. Thompson, administrator, Methuen, Mass.

Application July 31, 1946, Serial No. 687,383

1 Claim. (Cl. 192—46)

The invention relates to a gear clutch, and more especially to a lawn mower gear and locking device.

The primary object of the invention is the provision of a device of this character, wherein its structure is a refinement over the subject matter of Letters Patent No. 2,383,696, dated August 28, 1945, in that a more firm locking is had between the gear and the power shaft, due to the formation of the locking or clutch roller, and there is no liability of unclutching action of the latter, resultant from grease or other lubricant depositing thereon and the surface adjacent thereto, during the operation of the said device.

Another object of the invention is the provision of a device of this character, wherein the tensioning spring for the clutch roller is anchored thereto in a novel manner, so that repairs can be made, when the spring breaks with ease and dispatch, in that when the spring breaks under the construction disclosed in Letters Patent No. 2,383,696, there is no possible way of substituting a new spring in use with the gear, as the latter has to be discarded, thus requiring the substitution of a new gear and spring, which is a unitary set-up, while under the refinement over Letters Patent above indicated the new spring can be substituted for the old one, for use with the used gear.

A further object of the invention is the provision of a device of this character, wherein it has smooth operating action, and is positive in the working thereof for the clutching and unclutching operations, the device being novel in construction and is unique in the assembly thereof.

A still further object of the invention is the provision of a device of this character, which is simple in construction, thoroughly reliable and efficient in operation, strong, durable, readily and easily applied and removed with ease and dispatch, possessed of few parts, susceptible of quick repair, and inexpensive to manufacture and install.

With these and other objects in view the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a fragmentary side elevation of a lawn mower showing the device constructed in accordance with the invention in association therewith.

Figure 2 is an end view of the gear spindle or shaft with the gear in elevation and both being broken away.

Figure 3 is an elevation of the gear with the locking pin in position for locking the gear and spindle or shaft together.

Figure 4 is a view similar to Figure 3 showing the locking pin in releasing position.

Figure 5 is a perspective view of the locking pin and its leaf spring and removed from the gear.

Similar reference characters indicate corresponding parts throughout the several views in the drawing.

Referring to the drawing in detail, A designates generally a portion of a lawn mower, which is of a standard construction, having a power wheel, a portion thereof denoted at 10, while in internal toothed meshing engagement with such wheel is the driven pinion 11, having the locking device, indicated generally at B, as constituting the refinement over the subject matter of Letters Patent No. 2,383,696. This device B is for overrun clutch engagement of the pinion 11 with the driving spindle or shaft 12, for operating the lawn cutter element, not shown, of the mower A.

The device B, comprises a roller-like locking-pin 13 having a half circular shaped area 14 and an opposite upwardly or outwardly arched or convexed remaining area 15, respectively. Intermediate of the length of this pin 13 and merging with the same at the convexed area 15 is a narrow gage ear 16, to which is fixed one end of an open loop-formation leaf spring 17, which formation is best seen in Figure 5 of the drawing. The spring 17 is detachably fastened to the ear 16 by a fastener 18, and this attached end of such spring is superimposed upon the said ear. The inherent resiliency of the spring 17 is effective for clutch seating operation of the pin 13, as hereinafter described.

The gear pinion 11 internally thereof concentric to the center bore for the reduced end 19 of the spindle or shaft 12 is formed with an annular channel 20 opening into such bore and of a width for the seating of the spring 17 within such channel, the latter being centered in the pinion 11 to intersect the bore midway of its length. The pinion 11 is rotatably journaled on the end 19 of the spindle or shaft 12 and retained thereon by a removable retaining screw 21 and companion washer 22, respectively, the screw being tapped into the end 19, as best seen in Figure 2 of the drawing.

Built into the pinion 11 crosswise of the channel 20 for intersecting the same and communication with the bore for the reduced end 19 is an escapement notch 23, which is of a length slightly greater than the length of the pin 13 for the loose seating of the latter therein. This notch 23 is formed with a stepped double camming ceiling providing deep and shallow communicating segmental shaped cam surfaces 24 and 25, respectively, for over-riding or overrunning the pin 13 to force the latter into seating engagement, selectively, in semi-circular shaped locking grooves 26, formed spaced from each other peripherially in the reduced end 19 of the spindle or shaft 12. In this manner a clutching action and unclutching operation is had between the pinion 11 and the said shaft 12, accordingly to the direction of rotation of such pinion, the pin 13 being the locking medium.

The device B functions as an over-run clutch between the pinion 11 and the shaft 12, the action of the pin 13 with its spring 17 being best seen in Figures 3 and 4 of the drawing. The spring serves as a clip about the spindle or shaft 12, and also as an anchor for the pin 13 and the tensioning thereof for its proper operation. In one direction of rotation of the pinion 11 it is automatically locked to the spindle or shaft 12, while in reverse rotation, the said pinion 11 is freed from clutch engagement with the said spindle or shaft 12.

It should be apparent that the gear forms end walls to the notch 23 to retard end thrust of the pin 13, the latter being at all times in position for registry with the grooves 26 and confined partially within the said notch.

The pin 13 and its spring 17 is an assembly with the gear or pinion 11 on detaching the latter from the spindle or shaft 12, and also for convenient replacement, such pinion 11 and the pin 13 being interchangeable from one end to the other of the spindle or shaft 12. The assembly is practically dirt proof, as well as dust proof.

The assembly of the pin 13 and the spring 17 with the pinion 11, is had with dispatch, the said spring expands and seats itself against the ceiling of the groove or channel 20. The shallow of the notch 23 wedge locks the pin 13 in clutching position, while the deep surface 24 permits escapement activity or unclutching operation of this pin.

The ear 16 as provided on the pin 13 enables the spring 17 to be detached from the latter in event the said spring becomes unfit for service, and additionally this ear reinforces the spring at the point where the greatest strain occurs, and permits the assembly of these parts with ease and dispatch.

The arched area of the pin assures a more positive clutching action of the pin 13, and avoids any slippage of the pin resultant from grease formation between the gear or pinion and such pin.

What is claimed is:

A device for a gear and a shaft rotatably supporting the same, comprising a roller-like locking pin interposed between the gear and shaft, and having a half circular shaped area and an arched opposite area, respectively, a loop-like spring about the shaft, an ear projecting from the pin between the areas, a fastener connecting the spring to the ear for the detachable carrying of the said spring by the latter, and effecting tensioning action of the said spring on the pin, the gear being formed with a channel receiving the spring, the shaft being formed with pin seats concentrically thereof, and a cam surface on the gear for urging the pin into locking engagement in one of the seats and also for permitting escapement of such pin from the same on determined directions of rotation of either the gear or shaft.

ALBERT E. THOMPSON,
*Administrator of the Estate of Francis Edward Thompson, Deceased.*